US006589455B2

(12) United States Patent
Yoshida

(10) Patent No.: US 6,589,455 B2
(45) Date of Patent: Jul. 8, 2003

(54) METHOD OF MANUFACTURING A CONNECTOR POSITIONING STRUCTURE

(75) Inventor: Haruki Yoshida, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/223,324

(22) Filed: Aug. 20, 2002

(65) Prior Publication Data

US 2002/0193010 A1 Dec. 19, 2002

Related U.S. Application Data

(62) Division of application No. 09/805,515, filed on Mar. 14, 2001, now Pat. No. 6,482,025.

(30) Foreign Application Priority Data

Mar. 14, 2000 (JP) ........................................ 2000-71152

(51) Int. Cl.[7] .......................... B29C 45/37; B29C 45/80

(52) U.S. Cl. ................... 264/40.1; 264/328.1; 425/140; 425/555

(58) Field of Search ............................ 264/40.1, 328.1, 264/219; 425/555, 140, 141; 439/382, 680

(56) References Cited

U.S. PATENT DOCUMENTS 3,136,001 A * 6/1964 Gelbard ...................... 249/142
4,224,976 A * 9/1980 Blazek ....................... 249/157
5,476,705 A * 12/1995 Mizuse et al. .............. 264/318
5,689,191 A 11/1997 Kashiyama
5,877,622 A 3/1999 Aoyama et al.
6,135,594 A * 10/2000 Windey et al. ............. 425/555
6,156,986 A 12/2000 Tsai
6,187,242 B1 * 2/2001 Onoda ........................ 264/255

FOREIGN PATENT DOCUMENTS

JP 7-304067 * 11/1995
JP 2797919 7/1998
WO WO 99 52697 A 10/1999

OTHER PUBLICATIONS

Abstract 07–065923 Oct. 03, 1995.

* cited by examiner

*Primary Examiner*—Jill L. Heitbrink
(74) *Attorney, Agent, or Firm*—Sughrue Mion, PLLC

(57) ABSTRACT

At least one positioning projection (12, 13, 14, 15, 16 or 17) is formed at least on at least one deformed wall (e.g., 2) of a synthetic resin-made connector housing (1). The projecting height of the at least one positioning projection (12, 13, 14, 15, 16 or 17) is defined so as to correct an amount of deformation of the at least one wall (2, 3, 4 or 5), and positioning is effected by using the at least one positioning projection (12, 13, 14, 15, 16 or 17) as a reference. In case of a plurality of the positioning projections (12 to 17), the plurality of the positioning projections (12 to 17) are juxtaposed at least on the at least one wall (2, 3, 4 or 5), and projecting height of the plurality of positioning projections (12 to 17) are varied in correspondence with a shape of deformation of the at least one wall (2, 3, 4 or 5).

20 Claims, 9 Drawing Sheets

METHOD OF MANUFACTURING A CONNECTOR POSITIONING STRUCTURE

This is a Divisional of application Ser. No. 09/805,515 filed Mar. 14, 2001 now U.S. Pat. No. 6,482,025; the disclosure of which is incorporated herein by reference.

BACKGROUND OF THE INVENTION

1. Field of the Invention

The present invention relates to a connector positioning structure which makes it possible to perform such as a conductivity test of terminals inside a connector housing and the insertion of terminals into the connector housing without being affected by a deformation occurring when the connector housing is resin-molded.

The present application is based on Japanese Patent Application No. 2000-071152, which is incorporated herein by reference.

2. Description of the Related Art

FIG. 13 shows a related structure for setting and positioning a connector in a connector conduction-test tool.

A connector conduction-test tool 51 is for inspecting the presence or absence of the conductivity of terminals wire wires inside a connector 52, and includes a connector setting portion 54 fixed on a frame 53, a testing portion 56 slidable along guide rails 55 on the frame in face-to-face relation to the connector setting portion 54, and an operation lever 57 for slidably driving the testing portion 56.

The connector 52 includes a connector housing 58 formed of a synthetic resin and terminals with wires accommodated and retained in terminal accommodating chambers of the connector housing 58. The connector 52 in this embodiment is a male connector having female terminals accommodated inside it (in this specification, the connector having a connector fitting chamber in which male terminals project is defined as a female connector, while the connector which is fitted in the connector fitting chamber is defined as a male connector).

In the connector 52, a pair of vertically extending protrusions 59 are respectively formed on both sides of a rear end portion of the connector housing 58 for the purpose of positioning the connector 52 with respect to the connector setting portion 54. In the connector setting portion 54, a pair of vertically extending grooves 61 for slidable engagement with the protrusions 59 are respectively formed in two opposing side walls of a connector accommodating space 60. The protrusions 59 are engaged in the groove portions 61, and a lower wall and side walls 62 of the connector housing 58 are brought into contact with a bottom wall and side walls of the connector setting portion 54, thereby positioning the connector 52.

The testing portion 56 has a connector engaging chamber 63 formed therein to allow a front end portion of the connector 52 to advance into it. Probe pins 64 for contacting front ends of the female terminals inside the connector housing 58 are projectingly provided in the connector engaging chamber 63. Rear ends of the probe pins 64 are connected to leads 65, and the leads 65 are led out rearward from the testing portion and are connected to a testing apparatus body (not shown). As the other connector (not shown) connected to wires 66 led from the connector 52 is connected to the testing apparatus body, a loop circuit is formed, and OK is given in the conductivity test when the terminals of the connector 52 and the probe pins 63 contact each other. On the other hand, if, for example, the insertion of the terminals into the connector housing 58 is incomplete (half inserted), the probe pins 64 do not contact the terminals, and if the connection (crimping) between the terminals and the wires 66 is incomplete, even if the probe pins 64 are brought into contact with the terminals, conductivity with the wires 66 cannot be established. In either case, NG is given in the conductivity test.

However, with the above-described structure, in a case where there was a deformation in a connector housing 68 completed in the process of resin molding of the connector housing to such a degree that the deformation can be allowed as a product as shown in FIG. 14, when a deformed surface 70 of the connector housing 68 is made to abut against a wall surface (reference surface) 69 (serving as a reference) of the connector setting portion 54 of the connector conduction-test tool 51 (FIG. 13), positions 71 of the terminals inside the connector housing 68 and positions 72 of the probe pins 64 inside the testing portion 56 of the connector conduction-test tool 51 (FIG. 13) become offset from each other. Consequently, there has been concern that it becomes difficult for the front ends of the probe pins 64 to come into contact with the front ends of the terminals, resulting in a decline in the testing accuracy.

The deformation of the connector housing 68 is a phenomenon in which it is likely to occur in the case of a large connector housing or a connector housing having nonuniform thickness. It should be noted that, in FIGS. 14 and 15, front-side mating-terminal inserting holes continuing to the terminal accommodating chambers of the connector housing 68 are not illustrated, and the central positions 71 of the terminals are indicated by lines intersecting in the X- and Y-directions. The intersecting lines in FIG. 15 show the central positions 71 of the probe pins 64 of the connector conduction-test tool 51. In addition, reference numeral 73 denotes a lock arm with respect to the mating female connector housing, numeral 74 denotes a protective wall located around a press operating portion on the rear end side of the lock arm 73; and numeral 75 denotes a non-slip portion (pinching portion) for the connector fitting operation.

Meanwhile, FIG. 16 shows a modification of a female connector housing in which, during resin molding, an upper wall surface 80 of a substantially U-shaped projecting portion 78 having a lock projection 77 of a connector housing 76 in its interior is deformed in such a manner as to be slightly inclined with respect to an upper wall 81 of a connector fitting chamber 79. In this state, if positioning is effected by causing the wall surface 80 of the projecting portion 78 of the connector housing 76 to abut against a wall surface 82 (serving as a reference) of the connector setting portion of the connector conduction-test tool as shown in FIG. 17, centers 83 of the male terminals inside the connector housing 76 become positionally offset from the centers of the probe pins in the testing portion of the connector conduction-test tool. Hence, there arises concern that the testing accuracy deteriorates in the same way as described above.

It should be noted that, in the conductivity test of the connector, in a case where the connector 52 is inserted into the connector setting portion 54 from above as shown in FIG. 13, the upper wall surface 80 of the projecting portion 78 is, in many cases, made to abut against a lateral inner wall surface of the connector setting portion 54 in a state in which the longitudinal direction of the connector is aligned with the vertical direction. The aforementioned lock projection 77 is a portion which engages the projection of the lock arm 73 of the male connector housing 68 shown in FIG. 14.

The deformations of the above-described male and female connector housings 68 and 76 present concern not only during the connector conductivity test but also when the connector housings 68 and 76 are positioned and fixed in a connector receiving tool (setting portion) in the process of automatically inserting the terminals into the connector housings 68 and 76, for example, in which case centers of the front ends of the terminals that are inserted fail to align with centers of openings of the terminal accommodating chambers of the connector housings 68 and 76, resulting in faulty insertion of the terminals.

SUMMARY OF THE INVENTION

In view of the above-described problems, an object of the present invention is to provide a connector positioning structure which makes it possible to prevent such as the deterioration of testing accuracy at the time of the connector conductivity test due to the deformation of male and female connector housings during resin molding as well as the deterioration of insertion accuracy at the time of the automatic insertion of terminals into connector housings, thereby permitting accurate conductivity test and insertion of terminals, and the like.

To achieve the above object, a first aspect of the present invention, there is provided a connector positioning structure which comprises a synthetic resin-made connector housing, and at least one positioning projection formed on at least one deformed wall of the connector housing, wherein projecting height of the at least one positioning projection is defined so as to correct an amount of deformation of the at least one wall, and wherein positioning is effected by using the at least one positioning projection as a reference.

In the first aspect of the present invention, since the positioning projection is used as a reference instead of using the deformed wall of the connector housing as a reference, it is possible to accurately effect the positioning of the connector housing, i.e., the connector having terminals accommodated in the connector housing, without being affected by the deformation of the connector housing. Consequently, a connector conductivity test can be performed accurately without misalignment with respect to the terminals, and the automatic insertion of the terminals into the connector housing can be effected smoothly and reliably without misalignment with respect to the terminal accommodating chambers.

According to a second aspect of the present invention depending on the first aspect, it is effective that a plurality of the positioning projections are juxtaposed on the at least one wall, wherein projecting height of the plurality of positioning projections are varied in correspondence with a shape of deformation of the at least one wall.

In the second aspect of the present invention, since the amount of deformation of the connector housing is corrected by a plurality of positioning projections in correspondence with the shape of the deformed wall of the connector housing, the alignment of the connector housing can be effected accurately, and it is possible to easily and reliably cope with a complicated form of deformation.

According to a third aspect of the present invention depending on the first aspect or the second aspect, it is effective that the plurality of positioning projections are respectively disposed symmetrically on a plurality of the walls of the connector housing which are parallel with each other, such that a distance between outer end surfaces of the plurality of positioning projections is fixed.

In the third aspect of the present invention, in a case where two parallel walls of the connector housing are positioned along opposing inner wall surfaces of a setting portion of a connector conduction-test tool or the like, positioning projections provided on the two parallel walls are brought into contact with the opposing inner wall surfaces of the setting portion. Accordingly, the connector can be accurately positioned in the setting portion irrespective of the deformation of one or two walls of the connector housing.

According to a fourth aspect of the present invention depending on the third aspect, it is effective that the plurality of positioning projections are respectively disposed at edges of the plurality of walls of the connector housing, and wherein each of the plurality of positioning projections has the outer end surfaces which are perpendicular to each other.

In the fourth aspect of the present invention, in a case where the connector is positioned in two-dimensional directions (X-Y directions), one outer end surface and another outer end surface of each of the positioning projections which are perpendicular to each other are simultaneously brought into contact with the respective reference planes (inner wall surfaces) of the setting portion of the connector conduction-test tool or the like. Hence, the connector can be positioned accurately without being affected by the deformation of the walls in the two-dimensional directions of the connector housing.

According to a fifth aspect of the present invention depending on the first aspect, it is effective that the at least one positioning projection is disposed on a protruding portion of the connector housing.

According to a sixth aspect of the present invention depending on the second aspect, it is effective that the plurality of positioning projections are disposed on a protruding portion of the connector housing.

In the fifth and sixth aspects of the present invention, in the case where the connector is positioned in the setting portion of the connector conduction-test tool or the like by making use of a protruding portion of the connector housing, even if the protruding portion is deformed, the connector can be positioned accurately without being affected by the deformation of the protruding portion.

According to a seventh aspect of the present invention depending on any one of the above-described aspects, it is effective that the at least one positioning projection is one of a rib and a protrusion.

In the seventh aspect of the present invention, by using the projection extending long, such as a rib or a protrusion, the contact area with respect to the setting portion of the connector conduction-test tool or the like increases, so that the positioning attitude of the connector stabilizes.

According to an eighth aspect of the present invention depending on the seventh aspect, it is effective that length of the at least one positioning projection is defined so as to correct an amount of deformation of a wall on a side perpendicular to the at least one wall of the connector housing, so that a longitudinal end surface of the at least one positioning projection is used as a reference plane for positioning.

According to a ninth aspect of the present invention depending on any one of the first, second, third, fifth, and sixth aspects, it is effective that the at least one positioning projection has a curved surface for abutting against a mating reference plane.

Moreover, to achieve the above object, according to a tenth aspect of the present invention, there is provided a connector positioning structure which comprises a synthetic resin-made connector housing, and at least one positioning projection formed on at least one wall of the connector housing, wherein length of the at least one positioning projection is defined so as to correct an amount of deformation of a wall on a side perpendicular to the at least one wall, and wherein positioning is effected by using at least a longitudinal end surface of the at least one positioning projection as a reference.

In the eighth and tenth aspects of the present invention, by using a longitudinal end surface of the positioning projection, such as the rib or the protrusion, as a reference for positioning, the connector conductivity test can be performed accurately without misalignment with respect to the terminals without being affected by the deformation of a fitting front end surface of the connector housing, for example. At the same time, the automatic insertion of the terminals into the connector housing can be effected smoothly and reliably without misalignment with respect to the terminal accommodating chambers.

In the ninth aspect of the present invention, since the positioning projection at its curved surface and having a predetermined projecting height is smoothly and accurately brought into contact with an inner wall surface (mating reference plane) of the setting portion of the connector conduction-test tool or the like, the positioning accuracy of the connector improves further, and the connector setting operation is facilitated.

DETAILED DESCRIPTION OF THE PREFERRED EMBODIMENTS

Preferred embodiments of the present invention now will be described with reference to the accompanying drawings.

FIGS. 1 to 8 show an embodiment of a connector positioning structure in accordance with the present invention.

Figure 3:
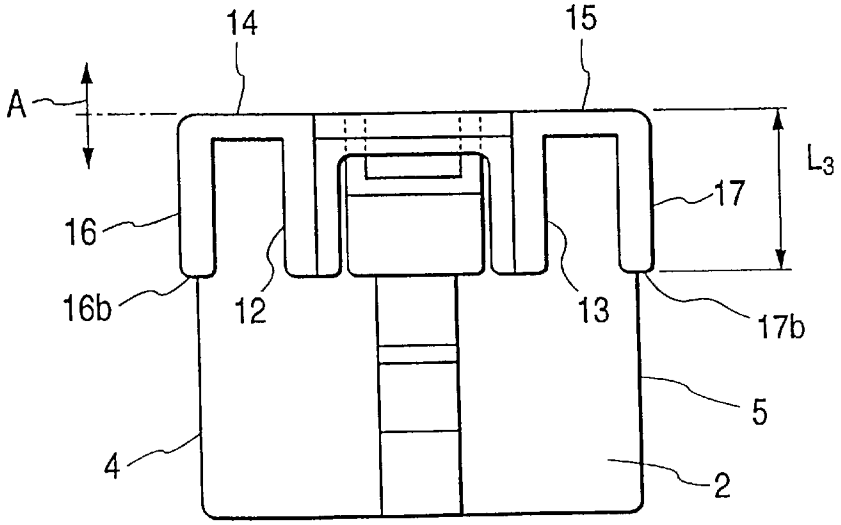
FIG. 3 is a top view illustrating the connector positioning structure.
Figure 4:
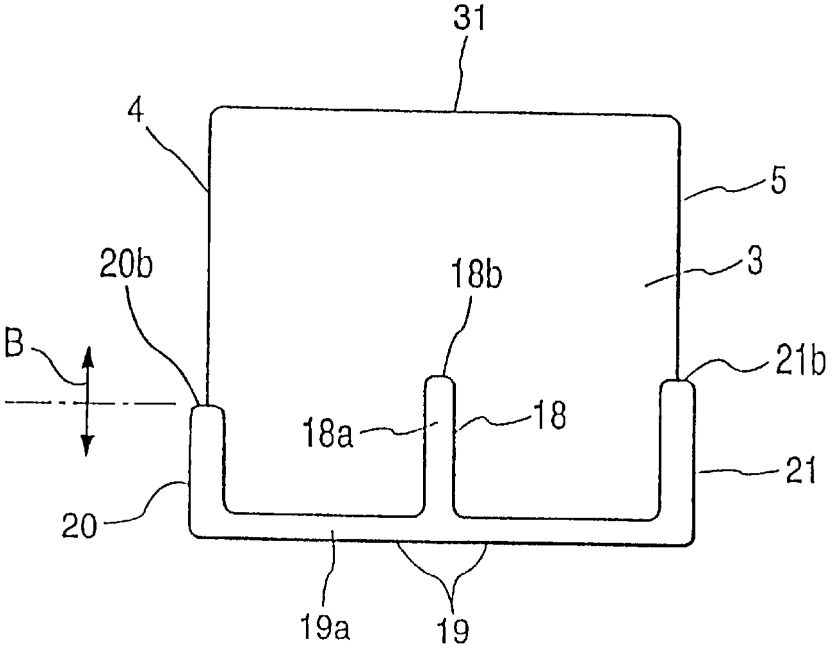
FIG. 4 is a bottom view illustrating the connector positioning structure.
Figure 5:
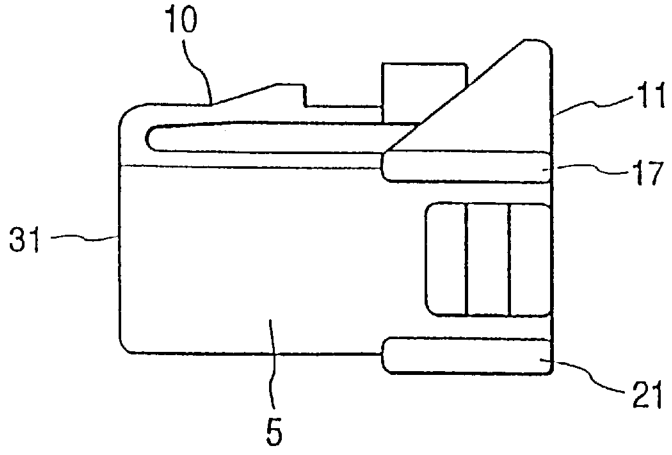
FIG. 5 is a side elevational view illustrating the connector positioning structure.

In this structure, on a rear side, as viewed in the connector fitting direction, of a rectangularly-shaped male connector housing 1 formed of a synthetic resin, positioning ribs (projections) 12 to 21 are respectively projectingly formed integrally with edges 6 to 9 formed by four, i.e., upper, lower, left, and right, walls 2 to 5, both sides of a protective wall 11 surrounding a lock arm 10 on the upper wall 2, rear ends of the upper and lower walls 2 and 3, and the center of the lower wall 3 (FIG. 4). The arrangement provided is such that, for instance, the vertical distance $L_1$ (FIG. 2) between an upper end surface of each of the ribs 12 to 17 and a lower end surface of each of the ribs 18 to 21, the horizontal distance $L_2$ between a left end surface of each of the ribs 16 and 20 and a right end surface of each of the ribs 17 and 21, and the distance between opposite end surfaces of each rib in the back-and-forth direction, i.e., the length $L_3$ (FIG. 3) of each of the ribs 12, 13, 16, 17, 18, 20, and 21 are constantly fixed irrespective of the relative size of the deformation of the connector housing 1. By using any or all of the positioning ribs 12 to 21 as a reference, the connector housing 1 is set (positioned and fixed) in a connector setting portion of a connector conduction-test tool (see FIG. 13) or a connector receiving tool of a terminal inserting apparatus (not shown).

The connector housing 1 is in a state prior to the insertion of terminals with wires (not shown) are inserted into the connector. The rear of the connector housing 1 is the side having terminal-inserting openings 23 (FIG. 7) of terminal accommodating chambers 22 (FIG. 6), and inserting holes 24 (FIG. 2) for the male terminals of the mating female connector (not shown) are provided in the front portion of the connector housing 1 in a plurality of stages.

The lock arm 10 (FIG. 1) rises from a front end side of the upper wall 2 of the connector housing 1, and extends to the vicinity of the rear end. The protective wall 11 rises on both sides of a press operating portion 25 of the lock arm 10 in the rear of the connector housing 1, and is connected to a rear upper portion of the operating portion 25. The rear end of the protective wall 11 extends to the rear end of the connector housing 1, while the front end of the protective wall 11 extends slightly forwardly of the operating portion 25.

Figure 1:
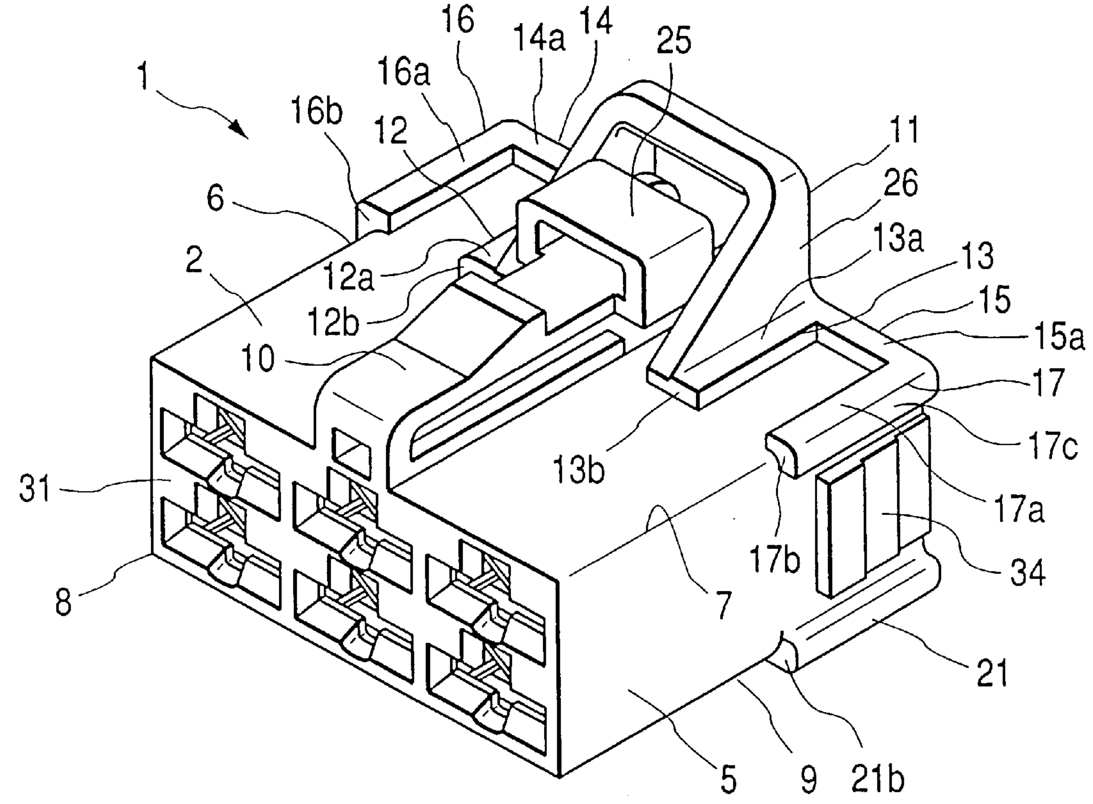
FIG. 1 is a perspective view illustrating an embodiment of a connector positioning structure in accordance with the present invention.

As shown in FIGS. 1 and 3, on the upper wall 2 of the connector housing 1, the first positioning ribs 12 and 13 are disposed on outer sides of left and right side wall portions 26 in parallel with each other and integrally with the side wall portions 26. The first ribs 12 and 13 extend straightly in the connecting fitting direction, and their shapes are slightly flat and rectangular in cross section. Their upper end surfaces 12*a* and 13*a* are completely flat, and project higher than the surface of the upper wall 2 of the connector housing 1. The length of the first ribs 12 and 13 is equal to the length of the side wall portions 26, and front end surfaces 12*b* and 13*b* of the first ribs 12 and 13 are vertical surfaces flush with the front end surfaces of the protective wall 11. It should be noted that the horizontal surfaces and the vertical surfaces of the ribs 12 to 21 are so named on the assumption that the connector housing 1 is laid horizontally, and it goes without saying that if the connector housing 1 is laid vertically, their horizontal surfaces will become vertical surfaces, and their vertical surfaces will become horizontal surfaces.

The first ribs 12 and 13 are orthogonally connected to the second positioning ribs 14 and 15 for the horizontal direction (FIGS. 1, 3, 6, and 7) at the rear rend of the connector housing 1. The terms "first" and "second" are merely given for convenience' sake for the purpose of explanation. The second ribs 14 and 15 extend from the protective wall 11 to the corner of the connector housing 1 in the widthwise outer direction along the rear end of the connector housing 1. The second ribs 14 and 15 are rectangular in cross section in the same way as the first ribs 12 and 13, and their upper end surfaces 14*a* and 15*a* are completely horizontal surfaces, while their rear end surfaces 14*b* and 15*b* (FIG. 7) are completely vertical surfaces. As shown in FIG. 3, the positions of the rear end surfaces 14*b* and 15*b* of the second ribs 14 and 15 can be finely adjusted in a back-and-forth direction (the rear end surfaces can be inclined) as indicated by the arrow A by resin molding.

The second ribs 14 and 15 are orthogonally connected to the third positioning ribs 16 and 17 (FIGS. 1, 2, 3, and 5) at the left and right corners on upper side of the rear end of the connector housing 1. The third ribs 16 and 17 are respectively disposed at the edges 6 and 7 formed by the upper wall 2 and the respective side walls 4 and 5 of the connector housing 1, are substantially inverse L-shaped in cross section, and extend forwardly in parallel with the first ribs 12 and 13 with an approximately identical length. Upper end surfaces 16*a* and 17*a* of the third ribs 16 and 17 are formed as completely horizontal surfaces, while their side end surfaces 16*c* and 17*c* (FIG. 2) thereof are formed as completely vertical surfaces. The left and right third ribs 16 and 17 respectively extend slightly forwardly of a pair of pinching portions (non-slip portions) 34 for the fitting operation located rearwardly of the side walls 4 and 5. Front end surfaces 16*b* and 17*b* of the third ribs 16 and 17 are respectively vertical. As shown in FIG. 3, the front end surfaces 12*b*, 13*b*, 16*b*, and 17*b* of the first and third ribs 12, 13, 16, and 17 may be slightly curved.

It should be noted that although, in the drawings, the first ribs 12 and 13 and the third ribs 16 and 17 respectively extend only forwardly of the second ribs 14 and 15, the rear end surfaces of the ribs 12, 13, 16, and 17 may respectively project slightly rearwardly of the second ribs 14 and 15.

Figure 2:
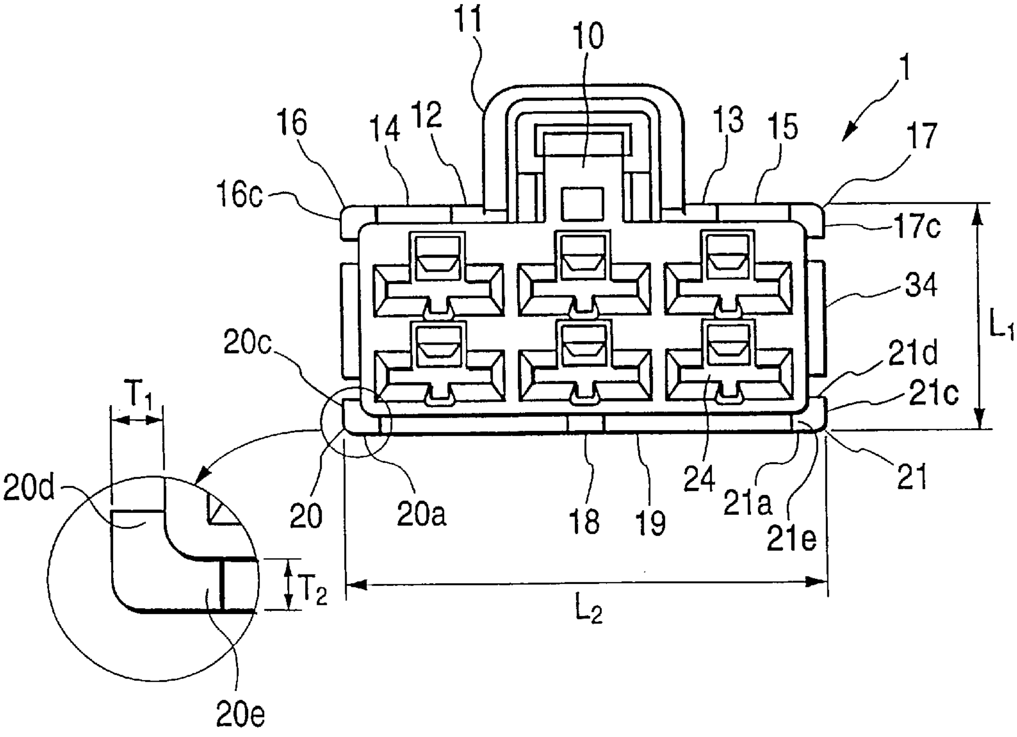
FIG. 2 is a front elevational view illustrating the connector positioning structure.

As shown in FIGS. 2 and 4, the fourth positioning rib 18 is formed on the rear side of the lower wall 3 (FIG. 4) of the connector housing 1 in a widthwise central portion thereof in such a manner as to extend with a length approximately identical to that of the first and third ribs 12, 13, 16, and 17 in the connector fitting direction. As also shown in FIG. 2, the shape of the fourth rib 18 is slightly flat and rectangular in cross section, and its lower end surface 18*a* (FIG. 4) is formed as a completely flat surface. The fourth rib 18 is orthogonally connected to the fifth positioning rib 19 extending along the rear end of the lower wall 3.

Figure 6:
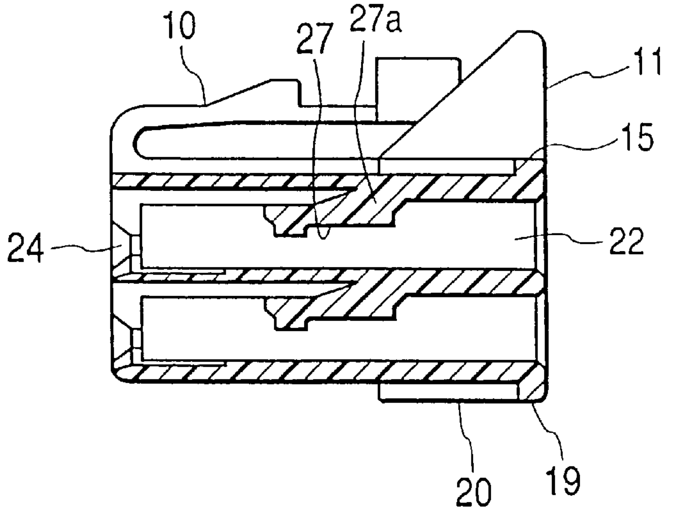
FIG. 6 is a vertical cross-sectional view illustrating the connector positioning structure.
Figure 7:
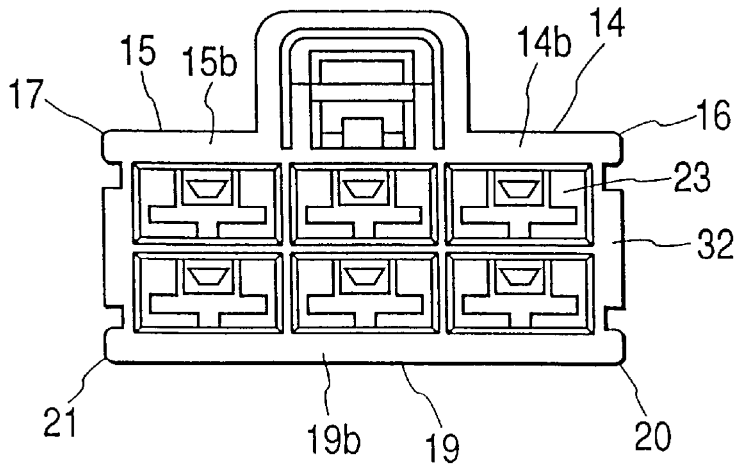
FIG. 7 is a rear view illustrating the connector positioning structure.

On both sides of the fourth rib 18, the fifth rib 19 (FIG. 4) extends horizontally in the lateral direction up to the respective corners of the lower wall 3 of the connector housing 1. The fifth rib 19 is rectangular in cross section as shown in FIG. 6, and is located in parallel with and symmetrically with the second ribs 14 and 15 on the upper side. A lower end surface 19*a* of the fifth rib 19 is formed as a completely horizontal surface, while its rear end surface 19*b* (FIG. 7) is formed as a completely vertical surface. The rear end surface 19*b* can be finely adjusted at a similar position (angle) in correspondence with the fine adjustment of the position (angle) of the rear end surfaces 14*b* and 15*b* of the second ribs 14 and 15 shown in FIG. 7 by resin molding.

At the left and right corners of the connector housing 1, the fifth rib 19 is orthogonally connected to the sixth positioning ribs 20 and 21 (FIGS. 1, 2, 4, and 5) extending along the ridges 8 and 9 (FIG. 1) formed by the lower wall 3 and the respective side walls 4 and 5. The sixth ribs 20 and 21 extend forwardly in parallel with the fourth rib 18 and the third ribs 16 and 17 with an approximately identical length, and have a substantially L-shaped vertical cross section symmetrical with the third ribs 16 and 17, as shown in FIG. 2. The sixth ribs 20 and 21 have completely vertical side end surfaces 20*c* and 21*c* and completely horizontal lower end surfaces 20*a* and 21*a*, respectively. The sixth ribs 20 and 21 have at least laterally projecting portions 20*d* and 21*d* and downwardly projecting portions 20*e* and 21*e*. This also applies to the third ribs 16 and 17.

During resin molding, the projecting heights $T_1$ and $T_2$ of the respective portions 20*d*, 20*e*, 21*d*, and 21*e*, i.e., the positions of the side end surfaces 20*c*, 21*c* and the lower end surfaces 20*a* and 21*a*, are adjustable. This also applies to the third ribs 16 and 17. Also, in the case of the first ribs 12 and 13 and the second ribs 14 and 15, the projecting height of their upper end surfaces (outer end surfaces) 12*a*, 13*a*, 14*a*, and 15*a* is adjustable, while in the case of the fourth rib 18 and the fifth rib 19, the projecting height of their lower end surfaces 18*a* and 19*a* is adjustable.

In addition, as shown in FIG. 4, the positions of front end surfaces 20*b* and 21*b* of the sixth ribs 20 and 21 can be adjusted in the back-and-forth direction as indicated by the arrow B during resin molding. As shown in FIG. 4, the rib 20 is adjusted to a shorter length than the rib 21. This positional adjustment of the front end surfaces is also possible in the case of the fourth rib 18. During the resin molding of the respective ribs, the second ribs 14 and 15 on the upper side allow the first ribs 12 and 13 and the third ribs 16 and 17 to communicate with each other, while the fifth rib 19 on the lower side allows the fourth rib 18 and the sixth ribs 20 and 21 to communicate with each other, thereby functioning to allow a molten resin material to flow into the ribs uniformly and satisfactorily.

It should be noted that, in FIG. 6, reference numeral 27 denotes a flexible retaining lance for retaining the terminal. A proximal portion 27*a* of each retaining lance 27 is substantially aligned with the position of the front end surfaces of the ribs 12, 13, 16, 17, 18, 20, an 21 extending in the connector fitting direction. Accordingly, even if the ribs are resin-molded, the flowing round of the molten resin material to the retaining lances 27 is not hampered.

Figure 8:
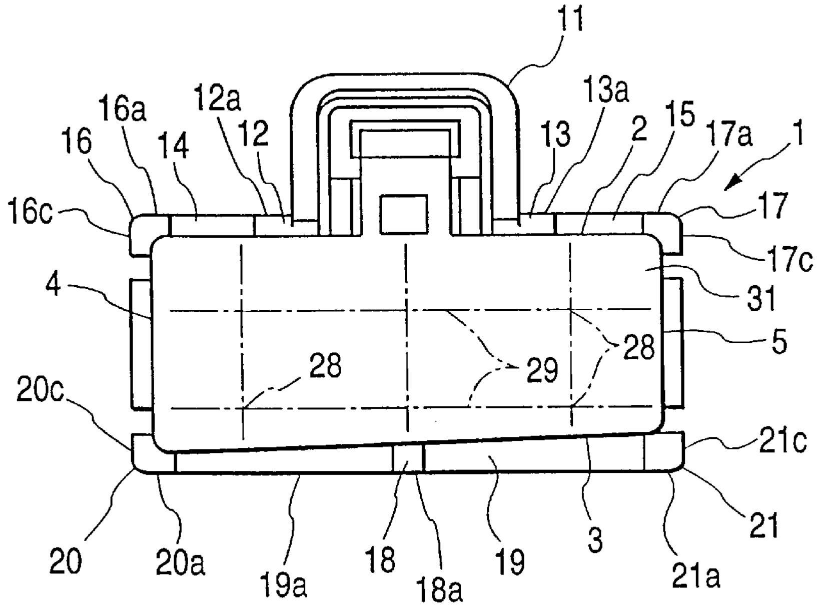
FIG. 8 is a front elevational view illustrating in an exaggerated form a specific form of the connector positioning structure.

FIG. 8 shows a form for adjusting the projecting height of the ribs 18 to 21 in correspondence with the deformation of the connector housing 1 during resin molding, i.e., a method of positioning the connector.

This connector housing 1 is deformed during the resin molding such that the lower wall 3 is linearly inclined rightwardly upward from one side portion to the other. To eliminate the effect of this deformation, the height of one sixth rib 20 on the lower wall 3 side ($T_2$ in FIG. 2) is set to be low, the height of the fourth rib 18 in the middle is set to be medium, and the height of the other sixth rib 21 is set to be high, such that a straight line connecting the lower end surfaces 18_a_, 20_a_, and 21_a_ of the ribs 18, 20, and 21 becomes parallel with the upper wall surface 2 of the connector housing 1 (accurately speaking, in such a manner as to be parallel with each straight line 29 connecting centers 28 of the terminals juxtaposed in the horizontal direction).

Adjustment of the height of the lower end surface 19_a_ of the fifth rib 19 on the rear side is also effected at the same angle of inclination as that of the straight line connecting the ribs 18, 20, and 21. The projecting height of the ribs 19 to 21 is gradually increased proportionally in correspondence with the angle of inclination of the lower wall 3 of the connector housing 1, i.e., the depth (magnitude) of the deformation. In FIG. 8, the distance ($L_1$ in FIG. 2) between at least the lower end surfaces (outer end surfaces) 18_a_ to 21_a_ of the ribs 18 to 21 on the lower side and the upper end surfaces (outer end surfaces) 12_a_, 13_a_, 16_a_, and 17_a_ of the ribs 12, 13, 16, and 17 on the upper side is fixed.

The setting of the height of these positioning ribs 12 to 21 is effected as follows: For example, before the manufacture of the connector housings 1, resin-molded samples of the connector housing 1 are obtained by carrying out resin molding experimentally, the amounts of deformation are grasped by measuring the dimensions of the various portions of the samples such as the height. On the basis of the results of the measurement, calculations are made as to the height of the relevant surfaces (vertical surfaces or horizontal surfaces) of the ribs 12 to 21 which should be set. The dimensions such as the height of rib molding portions of a resin mold are adjusted on the basis of the calculated values, thereby setting the height of the positioning ribs 12 to 21. After the setup of the height and the like of the rib molding portions, the mass production of the connector housings 1 is commenced. The sampling of the resin moldings and the measurement of dimensions are carried out periodically, and are of course effected when the mold is replaced.

It should be noted that as a method which is not based on sampling, it is possible to cite a method in which the dimensions of the various portions of the mass-produced connector housings 1 are measured in sampling inspection, and the connector housing 1 is set in a second mold having the rib molding portions so as to form the ribs 12 to 21 in two-color molding. This method is effective only in the case of production of a large number of items in small lots. In either method, the dimensions of the rib molding portions of the mold can be adjusted in microns or one-hundredth millimeters by moving an insert by, for example, a lead screw or the like.

Figure 9:
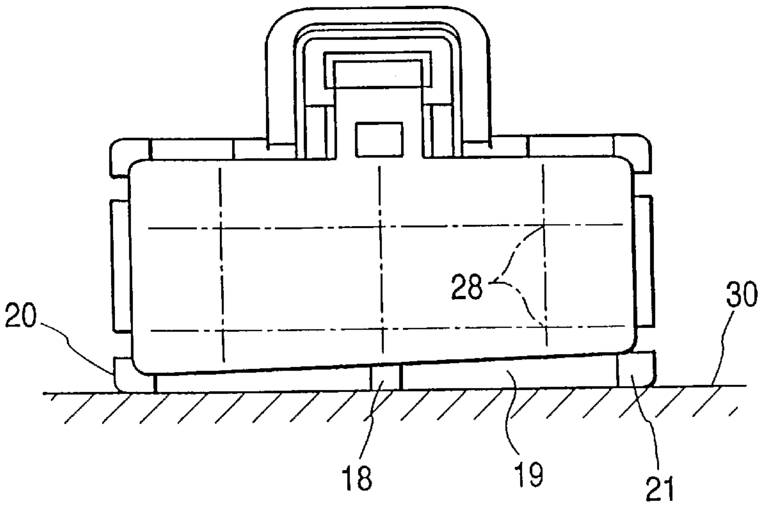
FIG. 9 is a front elevational view illustrating a state in which the connector is positioned with respect to a mating reference plane.

FIG. 9 illustrates a state in which the connector housing 1 is set in the connector setting portion of the connector conduction-test tool (see FIG. 13) or the connector receiving tool of the terminal inserting apparatus (not shown). Reference numeral 30 denotes a reference plane (mating reference plane) of the connector conduction-test tool or the connector receiving tool.

The inclination of the connector housing 1 is compensated for (corrected) by the height adjustment of the ribs 18 to 21 on the lower side, and the central positions 28 of the terminals inside the connector housing 1 are aligned with the centers of the probe pins of the inspecting portion of the connector conduction-test tool, whereby the conductivity test accuracy improves. Alternatively, the centers of the terminal accommodating chambers 22 (FIG. 6) of the connector housing 1 are aligned with the centers of the terminals with wires clamped by a chuck (not shown), thereby improving the terminal insertion accuracy.

It should be noted that in a case where, in FIG. 8, the upper wall 2 of the connector housing 1 is deformed in an inclined manner, and the upper wall is used as a reference for the connector conduction-test tool or the connector receiving tool, the height of the upper end surfaces 12_a_ to 17_a_ of the ribs 12 to 17 on the upper wall side is adjusted. Meanwhile, in a case where the side walls 4 and 5 of the connector housing 1 are deformed in an inclined manner, and the side walls 4 and 5 are used as references for the connector conduction-test tool and the connector receiving tool, the height of the side end surfaces (outer end surfaces) 16_c_, 17_c_, 20_c_, and 21_c_ of the ribs 16, 17, 20, and 21 on the side wall side is adjusted. In a case where the side wall 4 and the lower wall 3 or the side wall 5 and the upper wall 2 are simultaneously used as references, the inclination of the respective walls 2 to 5 is corrected by the height adjustment of the ribs on the respective wall side.

In addition, in a case where any or all of the front end surfaces 12_b_, 13_b_, 16_b_ to 18_b_, 20_b_, and 21_b_ of the ribs 12, 13, 16 to 18, 20, and 21 extending in the connector fitting direction are used as references by causing them to abut against reference planes of the connector conduction-test tool, the connector receiving tool, and the like, the inclination (deformation) of a front wall (wall portion) 31 (FIG. 1) including a fitting front end surface of the connector housing 1 is corrected by adjusting the position of the front end surfaces of the ribs 12, 13, 16 to 18, 20, and 21.

In case where, for example, the front wall 31 of the connector housing 1 is deformed in such a manner as to be linearly inclined rightwardly upward in FIG. 4, and the terminals and the terminal accommodating chambers 22 (FIG. 6) inside the connector housing 1 are located orthogonally to the front wall 31, the front end surface 20_b_ of the left-hand sixth rib 20 and the front end surface 16_b_ of the left-hand third rib 16 (FIG. 3) are set back with the same dimension (the ribs 16 and 20 are shortened), the front end surface 21_b_ of the right-hand sixth rib 21 (FIG. 4) and the front end surface 17_b_ of the right-hand third rib 17 (FIG. 3) are advanced with the same dimension (the ribs 17 and 21 are lengthened), and the angle of inclination of the straight line connecting the front end surfaces of the ribs 16, 17, 20, 18, and 21 is made identical to the angle of inclination of the front wall 31 of the connector housing 1 with the position of the front end surface 18_b_ of the fourth rib 18 kept as it is. Thus, by correcting the inclination of the terminals and the terminal accommodating chambers 22, the tips of the probe pins can be accurately brought into contact with the tips of the terminals during the conductivity test, and the terminals can be reliably inserted into the terminal accommodating chambers straightly and smoothly during the insertion of the terminals.

In addition, even if the front wall 31 of the connector housing 1 is deformed in an inclined manner, in a case where the terminals and the terminal accommodating chambers 22 are located in parallel with the side walls 4 and 5 of the connector housing 1 irrespective of the inclination of the front wall 31, the length of the ribs is kept unchanged and set to be identical, and the front end surfaces of the ribs are made to abut against the mating reference plane, thereby making it possible to perform the conductivity test and the terminal insertion without any problem. It should be noted that the front end surfaces 12_b_ and 13_b_ of the first ribs 12 and 13 may be set back together with the protective wall 11 so as not to abut against the connector conduction-test tool and the like.

In addition, in a case where the deformation of the connector housing 1 in FIG. 8 is such that the center of the lower wall 3 is recessed and is in a warped state, it is possible to make the rib 18 in the center higher and the ribs 20 and 21 on both sides lower so as to absorb the warp.

Figure 10:
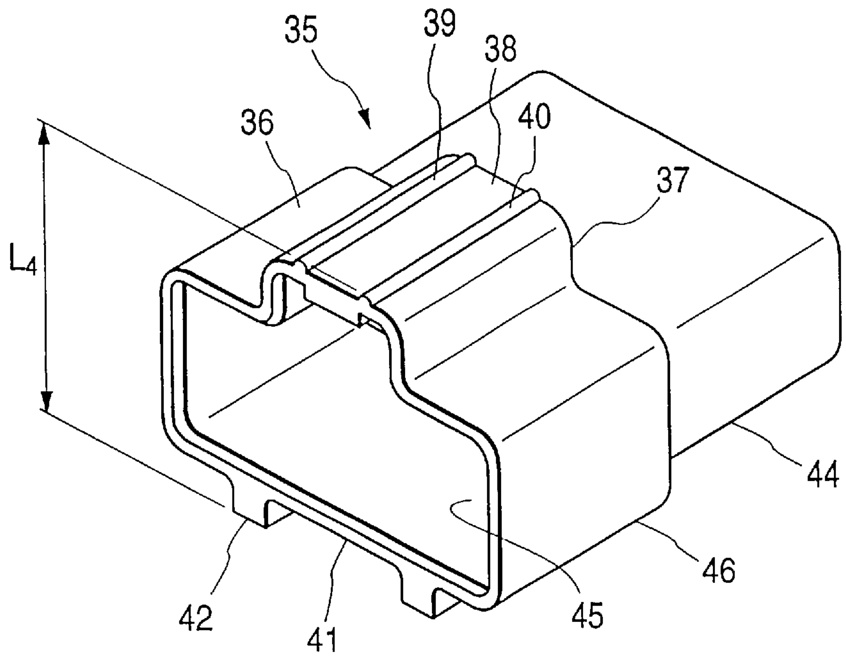
FIG. 10 is a perspective view illustrating another embodiment of the connector positioning structure in accordance with the present invention.
Figure 11:
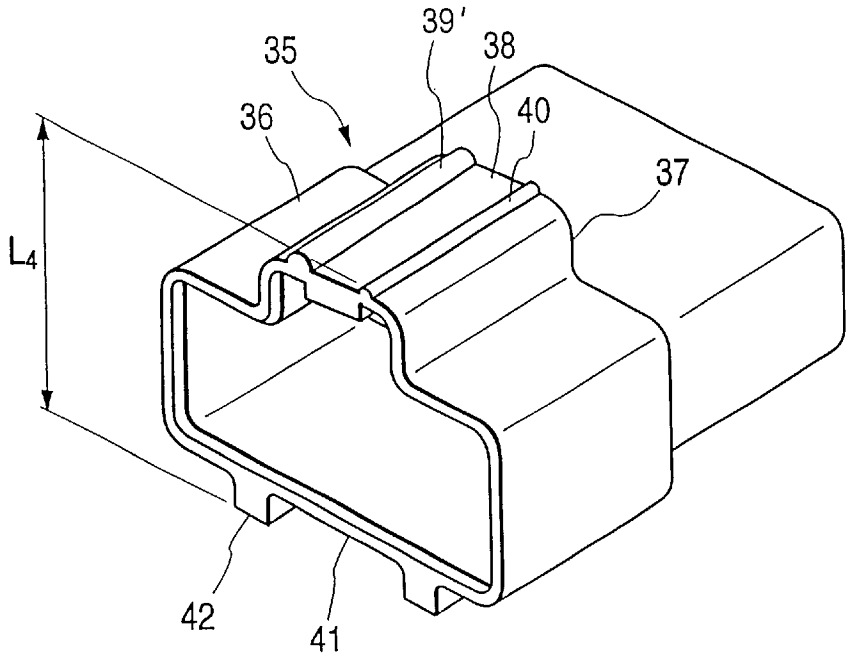
FIG. 11 is a perspective view illustrating in an exaggerated form a specific form of the connector positioning structure.
Figure 12:
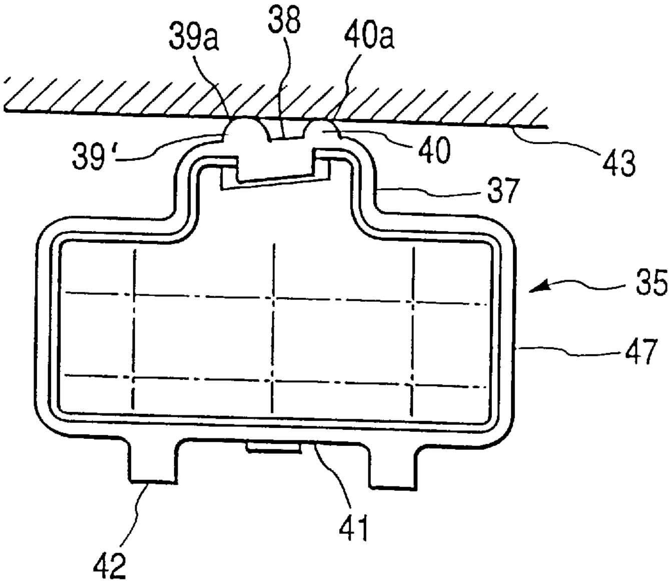
FIG. 12 is a front elevational view illustrating a state in which the connector is positioned with respect to the mating reference plane.

FIGS. 10 to 12 illustrate another embodiment of the connector positioning structure and the positioning method in accordance with the present invention.

In this structure, as shown in FIG. 10, a pair of left and right positioning protrusions (projections) 39 and 40 extending in the connector fitting direction are formed in parallel on an upper wall surface (outer wall surface) 38 of a protruding portion 37 for lock arm entrance formed on an upper wall 36 of a female connector housing 35, and by adjusting the height of the protrusions 39 and 40, horizontality with respect to, for instance, a supporting rib 42 on a lower wall 41 is ensured, thereby keeping the height $L_4$ at a fixed level. The pair of protrusions 39 and 40 are provided in such a manner as to be spaced apart as much as possible on the left and the right in the flat portion of the upper wall surface 38 of the protruding portion 37. Each of the protrusions 39 and 40 is formed in a semicircular shape in vertical cross section.

As shown in FIG. 11, in a case where the upper wall surface 38 of the protruding portion 37 is deformed in such a manner as to be inclined leftwardly downward with respect to the upper wall 36, the lower wall 41, or the lower supporting rib 42 of the connector housing 35, the diameter of a protrusion 39' on the left-hand side is set to be larger than the diameter of the protrusion 40 on the right-hand side, the dropped portion of the dimension of the upper wall surface 38 of the protruding portion 37 is compensated for by the dimension of the large-diameter protrusion 39' on the left-hand side such that a straight line connecting the upper ends of the protrusions 39' and 40 becomes completely parallel with the upper wall 36, the lower wall 41, or the lower end surface of the supporting rib 42 on the lower side, or, to be precise, such that the straight line becomes completely parallel with a straight line connecting the centers of the terminals (not shown) juxtaposed in the horizontal direction inside the connector housing 1 or the centers of the terminal accommodating chambers (not shown), so as to keep the height $L_4$ at a fixed level.

Then, as shown in FIG. 12, when the connector housing 35 is set in the connector conduction-test tool or the connector receiving tool by using as a reference the upper wall surface 38 of the protruding portion 37 of the connector housing 35, the connector housing 35 is positioned by causing the tips of the pair of left and right protrusions 39' and 40 to abut against a reference plane (mating reference plane) 43 of an inner wall of the connector conduction-test tool or the connector receiving tool. The diameter (projecting height) of one protrusion 39' is changed (adjusted) in correspondence with the degree of deformation (angle of inclination) of the upper wall surface 38 of the protruding portion 37, so that the distance $L_4$ (FIG. 11) between the straight line connecting the pair of protrusions 39' and 40 and, for instance, a straight line connecting the lower end surfaces of the supporting ribs 42 becomes always constant.

As a result, the straight line horizontally connecting the male terminals (not shown) inside the connector housing 35 is located parallel with the reference plane 43 for abutment of the connector conduction-test tool or the connector receiving tool, the centers of the probe pins of the connector conduction-test tool and the centers of the terminals are aligned with each other, or the centers of the terminals with wires clamped by the chuck of the terminal inserting apparatus and the centers of the terminal accommodating cambers of the connector housing 35 are aligned with each other.

It should be noted that a terminal accommodating portion 44 is formed on the rear half side of the female connector housing 35 shown in FIG. 10, and a connector fitting portion 46 including a connector fitting chamber 45 is formed on the front half side thereof. Contacting tab portions at front halves of the male terminals are projectingly located inside the connector fitting chamber 45. The terminals and the connector housing 35 form the female connector.

Figure 13:
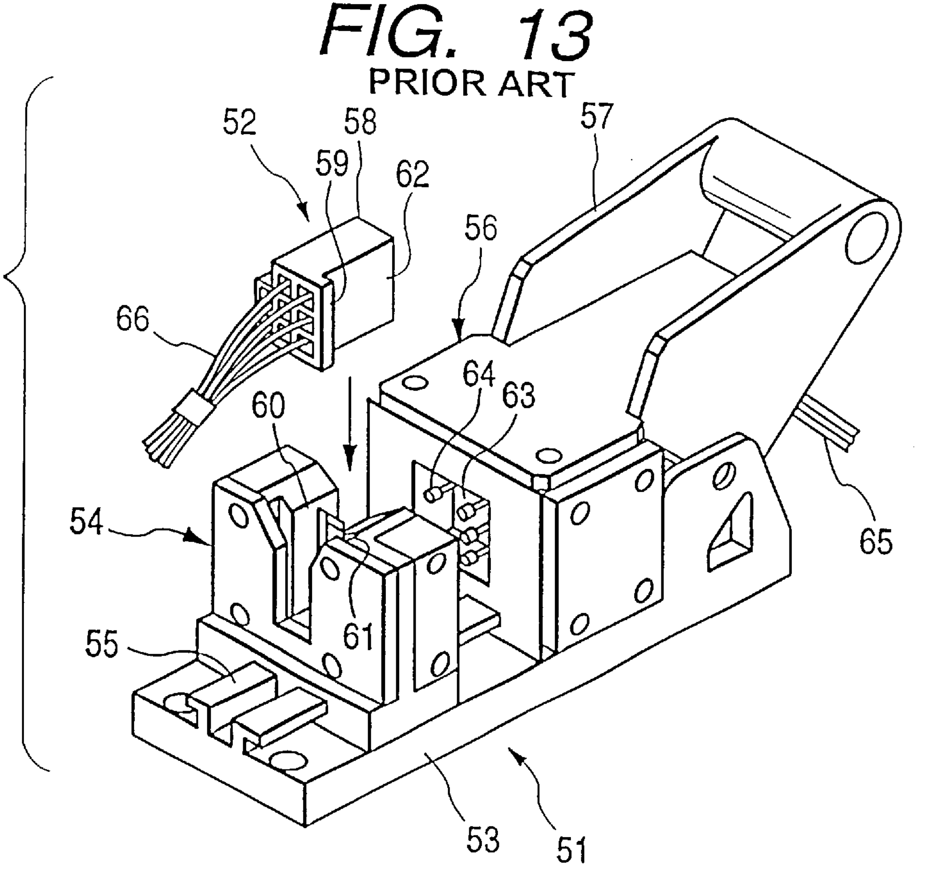
FIG. 13 PRIOR ART
FIG. 13 is an exploded perspective view illustrating a state in which the connector is set in an existing connector conduction-test tool.
Figure 14:
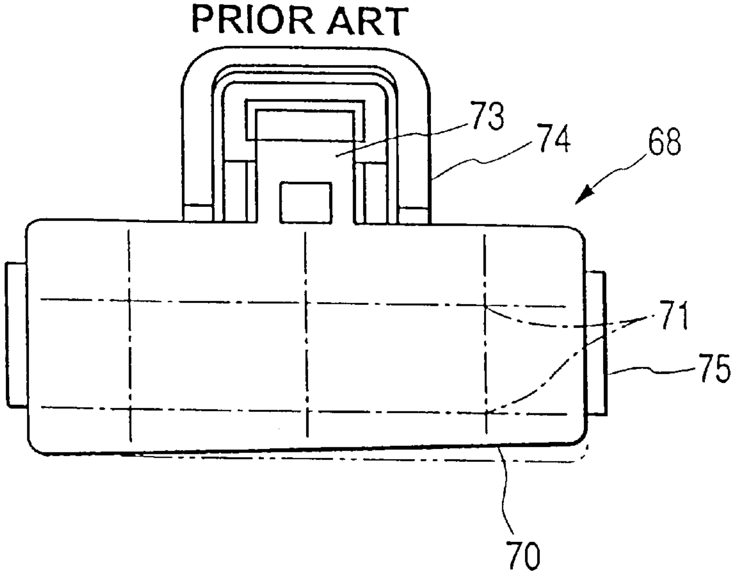
FIG. 14 PRIOR ART
FIG. 14 is a front elevational view illustrating in an exaggerated form a modification of a related connector.
Figure 15:
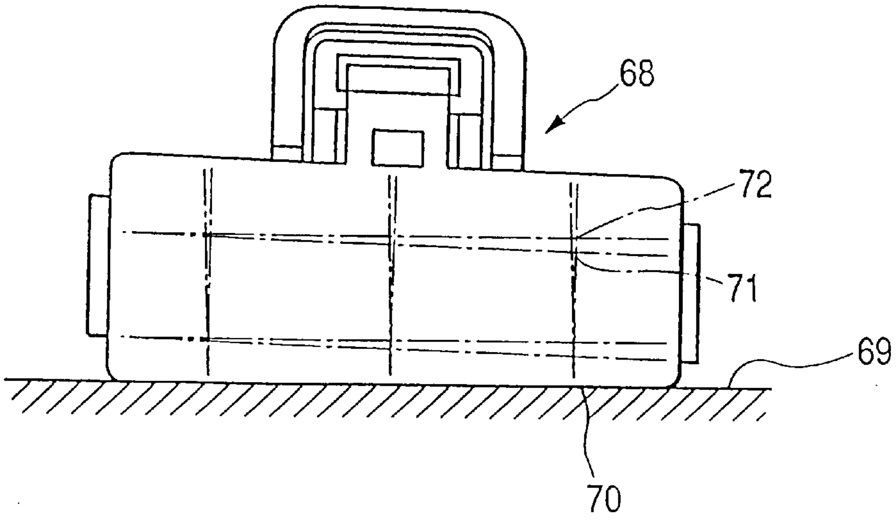
FIG. 15 PRIOR ART
FIG. 15 is a front elevational view illustrating a state in which a related connector is set with respect to the mating reference plane.
Figure 16:
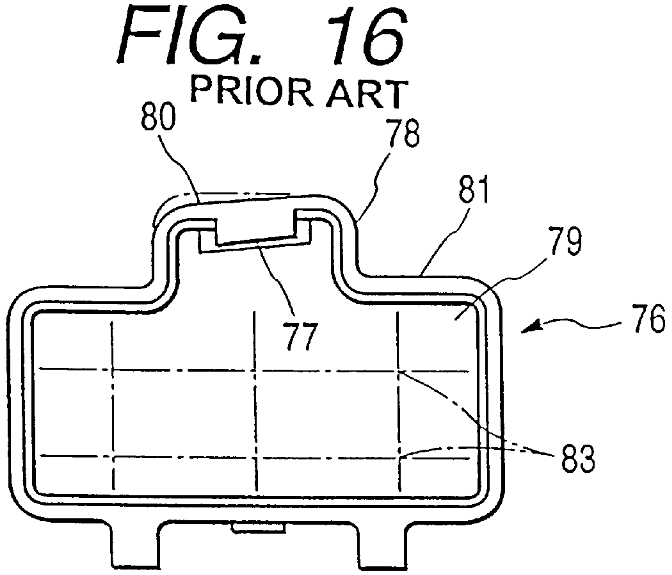
FIG. 16 PRIOR ART
FIG. 16 is a front elevational view illustrating in an exaggerated form another modification of the related connector.
Figure 17:
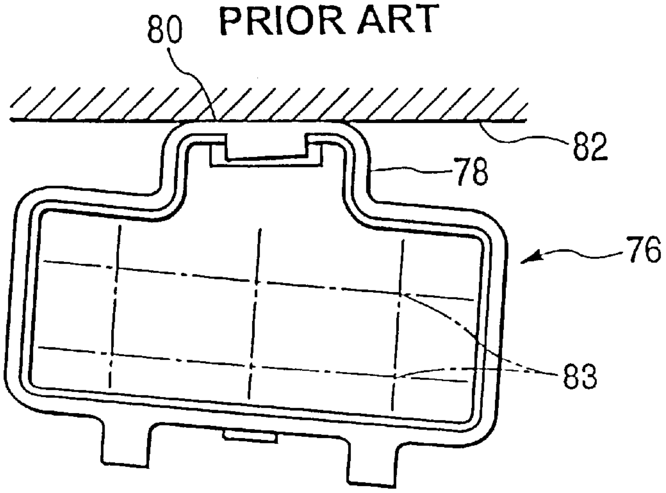
FIG. 17 PRIOR ART
FIG. 17 is a front elevational view illustrating a state in which the related connector is set with respect to the mating reference plane.

As also shown in FIG. 13, the connector is in many cases set in the connector conduction-test tool in a state in which the longitudinal direction of the connector is aligned with the vertical direction. In that case, the protruding portion 37 in FIG. 12 is located not on the upper side but on the lateral side. This also applies to the relationship between the upper wall 2 and the side wall 4 of the connector housing 1 in the first embodiment (FIG. 1).

In addition, in a case where the connector housing 35 is set in the connector conduction-test tool or the like by using a side wall 47 of the connector housing 35 as a reference in FIG. 12, when the side wall 47 is inclined, the pair of protrusions (39' and 40) having different diameters are formed on the side wall 47 in the same way as described above so as to absorb the inclination of the connector housing 35. Further, in a case where the supporting ribs 42 are not provided on the lower wall 41, and the connector housing 35 is set by using the lower wall 41 as a reference, the pair of protrusions (39' and 40) are formed on the lower wall 41. In a case where two perpendicular wall portions of the connector housing 35 are simultaneously used as references, two pairs of protrusions are respectively formed on the two wall portions so as to correct the inclination of the respective wall portions. The number of the protrusions 39' and 40 is not limited to two and may be three or more. This also applies to the ribs in the embodiment shown in FIG. 1. The smaller the number of the protrusions or ribs, the more adjustment is facilitated.

The method of formation of the positioning protrusions 39' and 40 is similar to the one in the above-described embodiment, and the projecting height of the protrusions 39' and 40 can be defined by the measurement of the dimensions of samples of the connector housing 35. The formation of the protrusions 39' and 40 with semicircular cross sections and different sizes can be easily coped with by varying the type of an insert having a groove with a semicircular cross section, for example.

Since the protrusions 39' and 40 are semicircular in cross section and have curved surfaces 39*a* and 40*a*, the protrusions 39' and 40 reliably come into contact with the mating inner wall surface (reference plane 43) not in the form of surface contact but in the form of line contact, and the height of the protrusions 39' and 40 can be easily set accurately. It is possible to use ribs such as those of the embodiment shown in FIG. 1 instead of the protrusions 39' and 40. Further, only the distal end surfaces of the ribs may be formed in a semicircular shape in cross section. The shape of the protrusions and ribs is not limited to the above-described embodiments.

In addition, in a case where the deformation of the connector housing 1 is relatively large in the first embodiment, for instance, the ribs (sixth ribs) 21 may be formed only on the side where the deformation is large in FIG. 8, and the lower wall 3 of the connector housing 1 may be used as it is as a reference on the side where the deformation is small. In the case of the protrusions 39' and 40 in FIG. 12, only the protrusions 39' on the side where the deformation of the protruding portion 37 is large may be formed, and the protrusion 40 on the side where the deformation is small may not be formed, and the upper surface of the protruding portion 37 may be used as it is as a reference.

As described above, since the positioning projection is used as a reference instead of using the deformed wall of the connector housing as a reference, it is possible to accurately effect the positioning of the connector housing, i.e., the connector having terminals accommodated in the connector housing, without being affected by the deformation of the connector housing. Consequently, a connector conductivity test can be performed accurately without misalignment with respect to the terminals, and the automatic insertion of the terminals into the connector housing can be effected smoothly and reliably without misalignment with respect to the terminal accommodating chambers.

In addition, since the amount of deformation of the connector housing is corrected by a plurality of positioning projections in correspondence with the shape of the deformed wall of the connector housing, the alignment of the connector housing can be effected accurately, and it is possible to easily and reliably cope with a complicated form of deformation.

In addition, in a case where two parallel walls of the connector housing are positioned along opposing inner wall surfaces of a setting portion of a connector conduction-test tool or the like, positioning projections provided on the two parallel walls are brought into contact with the opposing inner wall surfaces of the setting portion. Accordingly, the connector can be accurately positioned in the setting portion irrespective of the deformation of one or two walls of the connector housing.

In addition, in a case where the connector is positioned in two-dimensional directions (X–Y directions), one outer end surface and another outer end surface of each of the positioning projections which are perpendicular to each other are simultaneously brought into contact with the respective reference planes (inner wall surfaces) of the setting portion of the connector conduction-test tool or the like. Hence, the connector can be positioned accurately without being affected by the deformation of the walls in the two-dimensional directions of the connector housing.

In addition, in the case where the connector is positioned in the setting portion of the connector conduction-test tool or the like by making use of a protruding portion of the connector housing, even if the protruding portion is deformed, the connector can be positioned accurately without being affected by the deformation of the protruding portion.

In addition, by using the projection extending long, such as a rib or a protrusion, the contact area with respect to the setting portion of the connector conduction-test tool or the like increases, so that the positioning attitude of the connector stabilizes.

In addition, by using a longitudinal end surface of the positioning projection, such as the rib or the protrusion, as a reference for positioning, the connector conductivity test can be performed accurately without misalignment with respect to the terminals without being affected by the deformation of a fitting front end surface of the connector housing, for example. At the same time, the automatic insertion of the terminals into the connector housing can be effected smoothly and reliably without misalignment with respect to the terminal accommodating chambers.

In addition, since the positioning projection at its curved surface and having a predetermined projecting height is smoothly and accurately brought into contact with an inner wall surface (mating reference plane) of the setting portion of the connector conduction-test tool or the like, the positioning accuracy of the connector improves further, and the connector setting operation is facilitated.

What is claimed is:

1. A method for manufacturing a connector housing, said method comprising:
- molding at least one sample of a connector housing having at least one positioning projection formed thereon in a mold,
- measuring a dimension of at least one portion of said connector housing,
- calculating an amount of deformation of said connector housing from said dimension, and
- adjusting at least one parameter of said positioning projection based on said deformation.

2. The method as claimed in claim 1, wherein a plurality of said positioning projections are formed on at least one wall of said connector housing during said molding step, and wherein at least one dimension of at least one of said positioning projections is adjusted during said adjusting step based on said deformation.

3. The method as claimed in claim 2, wherein the plurality of positioning projections are positioned symmetrically on a plurality of parallel walls of said connector housing during said molding step, such that a distance between outer end surfaces of the plurality of positioning projections is fixed.

4. The method as claimed in claim 3, wherein the plurality of positioning projections are respectively formed at edges of the plurality of walls of the connector housing, and wherein each of the plurality of positioning projections has outer end surfaces which are formed perpendicular to each other during said molding step.

5. The method as claimed in claim 1, wherein said at least one projecting portion is formed on a protruding portion of said connector housing during said molding step.

6. The method as claimed in claim 1, wherein a plurality of positioning projections are formed on a protruding portion of said connector housing during said molding step.

7. The method as claimed in claim 1, wherein said at least one positioning projection is formed as one of a rib and protrusion.

8. The method as claimed in claim 1, wherein at least one of a length and height of the positioning projection is adjusted during said adjusting step based on said deformation.

9. The method as claimed in claim 1, wherein said at least one positioning projection is formed with a curved surface during said molding step for abutting against a mating reference plane.

10. The method as claimed in claim 1, wherein at least one of a length and height of the at least one positioning projection is adjusted during said adjusting step based on said deformation of a wall perpendicular to a second wall of said connector housing, so that a longitudinal end surface of said at least one positioning projection is used as a reference plane during a positioning of said connector housing.

11. A method for manufacturing a connector housing, said method comprising:
- molding at least one sample of a connector housing having at least one positioning projection formed thereon in a mold,
- measuring a dimension of said at least one positioning projection,
- calculating an amount of deformation of said connector housing from said dimension, and adjusting at least one parameter of said positioning projection based on said deformation.

12. The method as claimed in claim 11, wherein a plurality of said positioning projections are formed on at least one wall of said connector housing during said molding step, and wherein at least one dimension of at least one of said positioning projections is adjusted during said adjusting step based on said deformation.

13. The method as claimed in claim 12, wherein the plurality of positioning projections are positioned symmetrically on a plurality of parallel walls of said connector housing during said molding step, such that a distance between outer end surfaces of the plurality of positioning projections is fixed.

14. The method as claimed in claim 13, wherein the plurality of positioning projections are respectively formed at edges of the plurality of walls of the connector housing, and wherein each of the plurality of positioning projections has outer end surfaces which are formed perpendicular to each other during said molding step.

15. The method as claimed in claim 11, wherein said at least one projecting portion is formed on a protruding portion of said connector housing during said molding step.

16. The method as claimed in claim 11, wherein a plurality of positioning projections are formed on a protruding portion of said connector housing during said molding step.

17. The method as claimed in claim 11, wherein said at least one positioning projection is formed as one of a rib and protrusion.

18. The method as claimed in claim 11, wherein at least one of the length and height of the positioning projection is adjusted during said adjusting step based on said deformation.

19. The method as claimed in claim 11, wherein said at least one positioning projection is formed with a curved surface during said molding step for abutting against a mating reference plane.

20. The method as claimed in claim 11, wherein at least one of the length and height of the at least one positioning projection is adjusted during said adjusting step based on said deformation of a wall perpendicular to a second wall of said connector housing, so that a longitudinal end surface of said at least one positioning projection is used as a reference plane during a positioning of said connector housing.

* * * * *